(12) United States Patent
Paas

(10) Patent No.: US 8,619,088 B2
(45) Date of Patent: *Dec. 31, 2013

(54) SLIDE PREPARATION

(75) Inventor: Dale James Paas, Kitchener (CA)

(73) Assignee: BlackBerry Limited, Waterloo (CA)

( * ) Notice: Subject to any disclaimer, the term of this patent is extended or adjusted under 35 U.S.C. 154(b) by 199 days.

This patent is subject to a terminal disclaimer.

(21) Appl. No.: 12/939,434

(22) Filed: Nov. 4, 2010

(65) Prior Publication Data

US 2011/0242121 A1    Oct. 6, 2011

Related U.S. Application Data

(60) Provisional application No. 61/319,774, filed on Mar. 31, 2010.

(51) Int. Cl.
    *G09G 5/39*    (2006.01)
(52) U.S. Cl.
    USPC ........................................................ 345/531
(58) Field of Classification Search
    USPC ........................................................ 345/531
    See application file for complete search history.

(56) References Cited

U.S. PATENT DOCUMENTS

| | | | |
|---|---|---|---|
| 6,157,364 A | 12/2000 | Kohler | |
| 6,774,920 B1 | 8/2004 | Cragun | |
| 7,653,785 B2 * | 1/2010 | Bailey et al. | 711/118 |
| 7,954,055 B2 * | 5/2011 | Sylthe | 715/273 |
| 8,176,065 B2 * | 5/2012 | Hwang et al. | 707/758 |
| 2002/0007404 A1 | 1/2002 | Vange | |
| 2003/0014499 A1 | 1/2003 | Mighdoll | |
| 2003/0212744 A1 * | 11/2003 | Dunlap et al. | 709/204 |
| 2003/0222890 A1 | 12/2003 | Salesin et al. | |
| 2004/0010629 A1 | 1/2004 | Diesel | |
| 2004/0128691 A1 * | 7/2004 | Egawa et al. | 725/88 |
| 2007/0100938 A1 | 5/2007 | Bagley et al. | |
| 2008/0022050 A1 | 1/2008 | Fung | |
| 2008/0120360 A1 * | 5/2008 | Dumitru et al. | 709/203 |
| 2009/0167895 A1 * | 7/2009 | Hoshuyama et al. | 348/231.6 |

FOREIGN PATENT DOCUMENTS

WO    2007073584 A1    7/2007

OTHER PUBLICATIONS

Novel Cache Management Strategy for Semantic Caching in Mobile Environment; S. Kami Makki, Xunhang Zhou; 2008; Downloaded May 18, 2012 http://portal.acm.org/citation.cfm?id=1456265.
Overview of Design Patterns; Mark Grand; 2002; Downloaded May 18, 2012 http://www.mindspring.com/~mgrand/pattern_synopses.htm.
Adaptive File Cache Management for Mobile Computing; Jiangmei Mei, Rick Bunt; 2003; Downloaded May 18, 2012 http://www.springerlink.com/content/x3lyx6r1017ybtgv/.

(Continued)

*Primary Examiner* — Kee M Tung
*Assistant Examiner* — Frank Chen
(74) *Attorney, Agent, or Firm* — Novak Druce Connolly Bove + Quigg LLP

(57) ABSTRACT

Presenting a slide. Anticipating a slide to be selected for display. Receiving data of the anticipated slide in an unconstructed format. Constructing the anticipated slide from the received data. Caching the constructed slide. Pre-drawing the constructed slide in construction memory. Receiving instructions to display a slide. In the event that the instructed slide is the cached and pre-drawn slide, rendering the pre-drawn slide to display memory.

15 Claims, 8 Drawing Sheets

(56) References Cited

OTHER PUBLICATIONS

Powerpoint to DVD; 2012 http://tehparadox.com/forum/f93/powerpoint-dvd-58088/.

ViewONE Pro Document Streaming Server Module; Daeja Image Systems Ltd.; 2012; Downloaded May 18, 2012 http://www.daeja.com/products/viewone-pro-document-streaming-module.asp.

Configuring Pre-rendering; IBM; 2009; Downloaded May 18, 2012 http://publib.boulder.ibm.com/infocenter/wcmdoc/v6r1/index.jsp?topic=/com.ibm.lotus.wcm.doc_v615/wcm/wcm_config_delivery_pre-rendered_enable.html.

Extended European Search report dated Jul. 18, 2011, in corresponding application No. 10190014.0.

Canadian Office Action mailed Dec. 4, 2012, in corresponding Canadian patent application No. 2,720,054.

Office Action mailed May 30, 2013, in corresponding Canadian patent application No. 2,722,726.

* cited by examiner

SLIDE PREPARATION

CROSS REFERENCE TO RELATED APPLICATIONS

This application claims priority from U.S. Provisional Pat. App. Ser. No. 61/319,774, filed on Mar. 31, 2010, the contents of which are incorporated herein in their entirety for all purposes.

FIELD

The technology disclosed herein (the "technology") relates to processor-implemented presentation systems. More specifically, the technology relates to caching a constructed slide of a presentation.

BRIEF DESCRIPTION OF THE DRAWINGS

Reference will now be made, by way of example, to the accompanying drawings which show example implementations of the present application.

DETAILED DESCRIPTION

Figure 1:
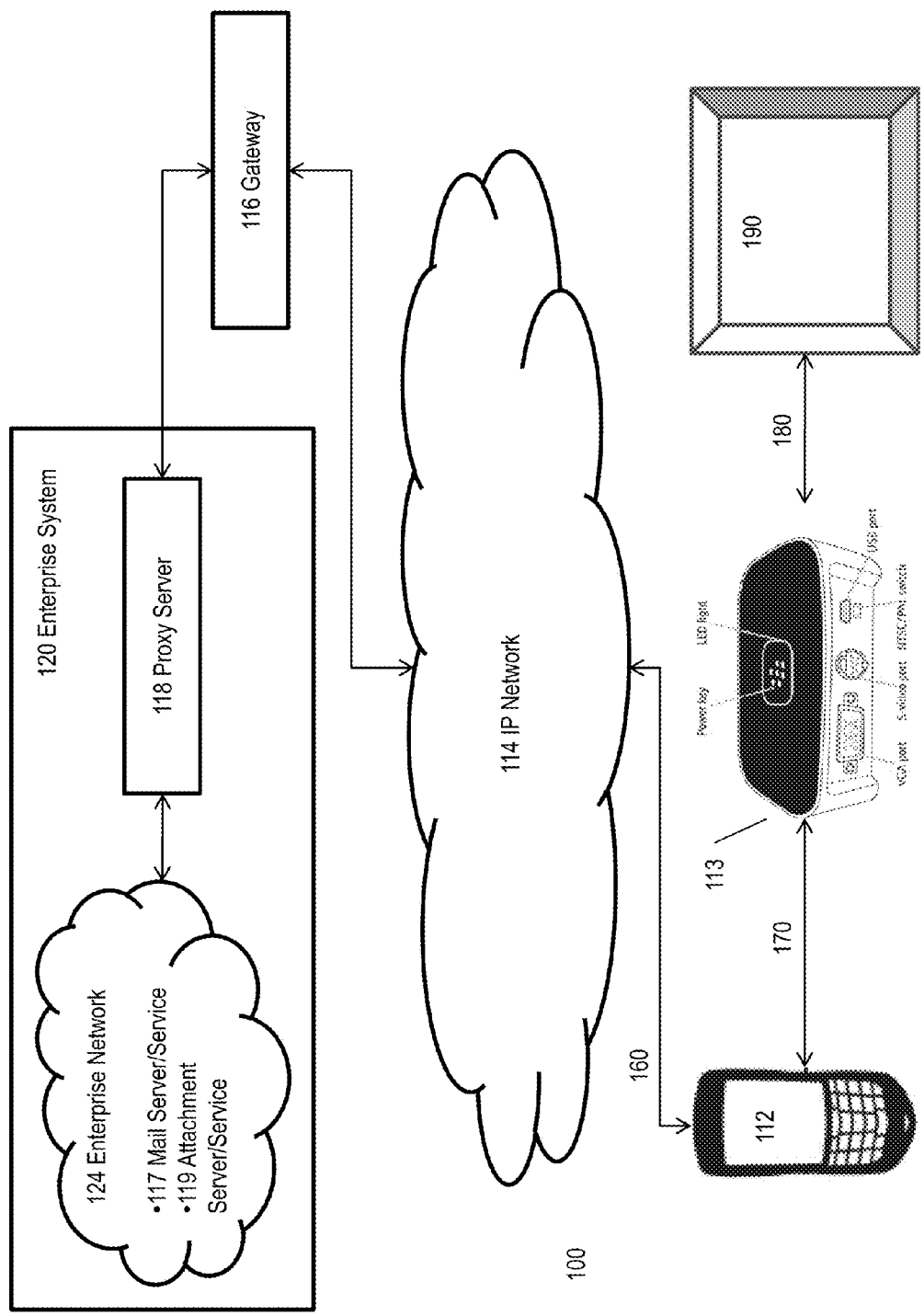
FIG. 1 is a schematic diagram of a wireless communication system.

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

Electronic slide presentations are a common way to present information to one or more viewers. Slide presentation software (e.g. Microsoft® Office PowerPoint®) facilitates the creation of multimedia files incorporating text, images, audio and/or visual clips for presentation in one or more slides. Often the files are presented in a slideshow, displaying the slides sequentially. The slides may be displayed to a display screen of a computing device (e.g., a personal computer), or via a presentation device such as a projector for projecting the presentation to a remote screen.

More particularly, portable electronic devices such as wireless mobile devices (cellular phones, PDAs, etc.) among others, may include a viewer for displaying slide presentations in multiple display modes, such as a text mode for displaying text information distilled from the slides, a preview mode for displaying thumbnail slide images rendered from the slides and a mixed mode for displaying both text information and thumbnail slide images together. The slide presentation viewer may also include a slide show mode to display the slide images in full screen along with an interface (e.g. menu) for selecting among the multiple modes and for invoking and controlling the slide show. For handheld wireless communication devices in particular, a network server may process slide presentation files to generate the text information and slide images for communicating to wireless devices equipped with appropriate slide presentation viewers. The network server may be an attachment server providing services for email attachments and the slide presentation viewers may be attachment viewers for email or dedicated viewers for presentations.

Handheld communication devices may also be capable of remotely controlling display of an electronic slide presentation. For example, a presentation mode of operation may be provided for wirelessly controlling display of a slide presentation on, or through, a presentation device. When controlling a presentation in this fashion, the slides being displayed on the handheld electronic device can be the same as those displayed on the presentation device (or on a display connected to the presentation device.

The term "slide" as used throughout the specification and drawings includes, but is not limited to, a single presentation slide (such as a PowerPoint® slide), a page in a PDF file, or a single photo image.

FIG. 1 shows a communication network system 100 comprising at least one portable electronic device 112, an IP network 114 (including a wireless carrier network and base station (not shown)), a wireless network gateway 116, an enterprise email server 117, an enterprise wireless communication device server or proxy server 118, an attachment server 119, a display 190, and interconnections therebetween.

The portable electronic device 112 can be operable to effect communications over an IP network 114 via a radio communications channel 160, and communicates with the base station (not shown) while located within a coverage area that is defined by the base station. The base station can be part of the IP network 114, or other network such as a Wireless Wide Area Network (WWAN). Data can be delivered to the portable electronic device 112 via wireless transmission from the base station. Similarly, data can be sent from the portable electronic device 112 via wireless transmission to the base station.

It will be appreciated that the portable electronic device 112 can be movable within the coverage area and can be moved to coverage areas defined by other base stations. Generally, portable electronic devices 112 can be connected to a wireless network that may comprise one or more of a WWAN and a Wireless Local Area Network (WLAN) or other suitable network arrangements such as 114. In some implementations, the devices 112 can be configured to communicate over both the WWAN and WLAN, and to roam between these networks. In some implementations, the wireless network may comprise multiple WWANs and WLANs.

The WWAN may be implemented as any suitable wireless access network technology. By way of example, but not limitation, the WWAN may be implemented as a wireless network that includes a number of transceiver base stations where each of the base stations provides wireless Radio Frequency (RF)

coverage to a corresponding area or cell. The WWAN is typically operated by a mobile network service provider that provides subscription packages to users of the mobile communication devices. In some implementations, the WWAN conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN may further comprise, or interface with, a wireless network gateway 116 that connects the devices 112 to transport facilities, and through the transport facilities to an enterprise system 120. Transport facilities may include one or more private networks or lines, the Internet, a virtual private network, or any other suitable network. The enterprise system 120 may be operated, for example, by an organization or enterprise such as a corporation, university, or governmental department that allows access to a network 124 such as an internal or enterprise network (e.g., an intranet) and its resources, or the enterprise system 120 may be operated by a mobile network provider. In some implementations, the network 124 may be realized using the Internet rather than or in addition to an internal or enterprise network.

The portable electronic device 112 is further operable to deliver content to and control a presentation device 113. For example, device 112 can send slide presentation content and control signals to the presentation device 113 for controlling display of a presentation, such as a Microsoft® Office PowerPoint® presentation or successive pages of an image attachment, such as a Portable Document Format (PDF) document. The electronic device 112 can communicate with the presentation device 113 over communications link 170, e.g., a wired or wireless link. Communications link 170 between the electronic device 112 and the presentation device 113 can be, for example, a Bluetooth® wireless technology communications link.

Proxy server 118 can handle client requests from the portable electronic device 112 for documents stored within attachment server 119. The attachment server 119 can communicate with the proxy server 118 to transmit attachments such as documents, spreadsheets, images, multimedia files, etc. through the gateway 116 and network 114 for viewing via an attachment viewer of the portable electronic device 112 so as to allow a user to view attachments that are received in email messages. While only one attachment server 119 is shown for illustration purposes, a person skilled in the art will understand that the attachment server 119 alternatively can be a network of attachment servers. Sources for the attachments stored within server 119 can include mail server 117, and may include a web server, IM server, etc. Preferably the attachment data is downloaded to portable electronic device 112 in chunks of binary data in an attachment viewer readable format, for example Universal Content Stream (UCS) format.

Figure 2:
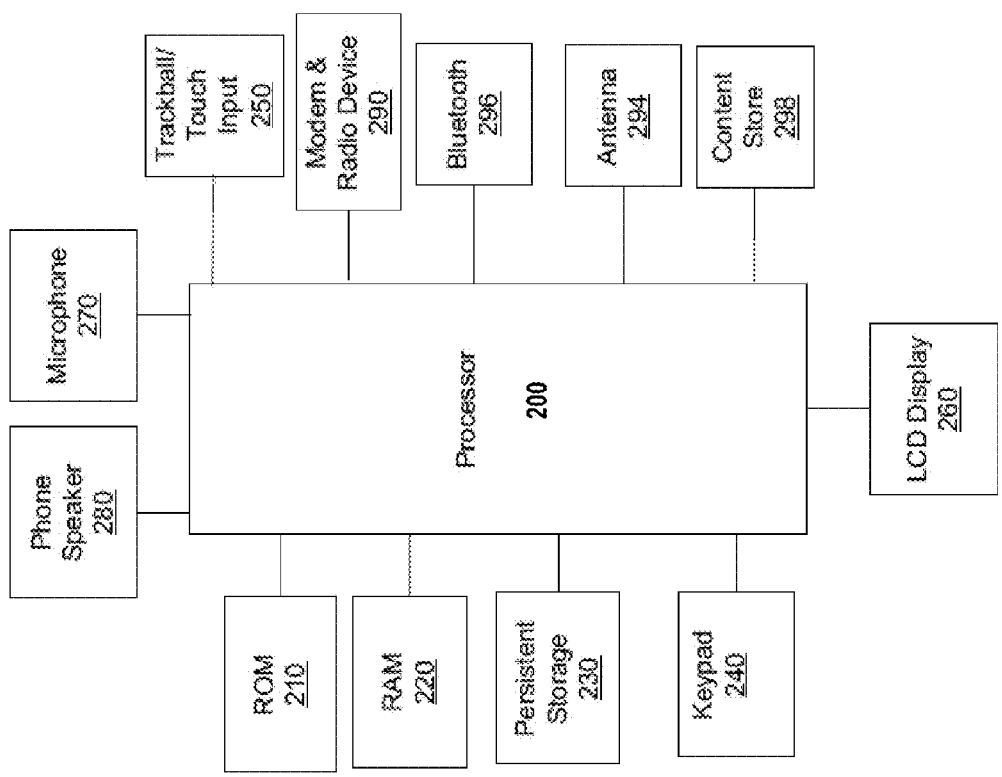
FIG. 2 is a block diagram of components of a portable electronic device forming part of the communication system of FIG. 1, according to an implementation.

Referring now to FIG. 2, a block diagram of some typical components within the portable electronic device 112 is shown. In the illustrated implementation, the portable electronic device 112 is based on the computing environment and functionality of a wireless personal digital assistant (PDA). It will be understood, however, that the portable electronic device 112 is not limited to wireless personal digital assistants. Other portable electronic devices are possible, such as smart telephones, laptop computers, and tablet computers.

The portable electronic device 112 can include a processor 200 connected to a read-only-memory (ROM) 210 that can contain a plurality of applications executable by the processor 200 that can enable the portable electronic device 112 to perform certain functions including, for example, PIN message functions, SMS message functions and cellular telephone functions, and at least one attachment viewer application for viewing attachments (e.g. document attachments to emails or documents from other sources, such as web servers, etc.). The processor 200 is also connected to a random access memory unit (RAM) 220 and a persistent storage device 230, which are responsible for various storage functions of the portable electronic device 112. The processor 200 receives input from input devices such as a keypad 240 and a trackball or touch sensitive input 250. The processor 200 outputs to various output devices, such as an LCD display 260. A microphone 270 and phone speaker 280 are connected to the processor 200 for cellular telephone functions. The processor 200 is also connected to a modem and radio device 290. The modem and radio device 290 is used to connect to wireless networks for transmitting and receiving voice and data communications through an antenna 294. A Bluetooth® wireless technology receiver/transmitter 296 is provided to effect wireless communication between device 112 and other Bluetooth-enabled devices, such as presentation device 113, as discussed in greater detail below. A content store 298, which is generally a file storage system for the portable electronic device 112, is also provided. Though not illustrated, the device 112 can include other near-range communications interfaces, e.g., an infrared interface operating similar to television remote control interface.

Request/view functionality for an attachment can be provided by the client/server combination of attachment viewer within the portable electronic device 112 and the attachment server 118. More particularly, with reference to FIG. 3, portable electronic device 112 can be configured (e.g. via software stored, for example, in ROM 210) to comprise various components including an operating system 300, a communications system 305 for wireless communication, an email application 310 and other applications 315. Email application 310 can comprise or otherwise cooperate with various attachment viewers 320 for retrieving and viewing attachments. One such attachment viewer is slide presentation viewer 325. Other viewers 330 include spreadsheet viewers, image viewers, word processing document viewers, etc. (not described herein). Other applications 315 include other communication and control applications 317 and a presentation application 319 for communicating with and controlling presentation device 113. The presentation application 319 can communicate with one or more presentation devices via wired or wireless connections, including cables, radio frequency, and infrared media.

Attachment server 119 can be configured (e.g. via software stored, for example, in non-volatile memory (not shown)) to comprise various components including a operating system 335, communications system 340, slide presentation attachment handler 345 as well as other attachment handlers 347 for other attachment types. Slide presentation attachment handler 345 can comprise or otherwise cooperates with a text distiller 350 and slide renderer 355. Text distiller 350 can be configured to parse or otherwise review slide presentation documents to extract text information for delivery to handheld devices such as portable electronic device 112. Slide renderer 355 can define rasterized slide images (e.g. in a jpeg, tiff or other image format) from the slide presentation document for each slide for similar delivery.

The attachment server 119 and/or proxy server 118 and portable electronic device 112 can communicate such that when a user invokes the attachment viewer 325 to view the content of a slide presentation, the portable electronic device 112 can transmit one or more requests for slide information, (i.e. the text information and slide images) and receives same in response. Requests and responses are illustrated notionally as communicating directly between the portable electronic device 112 and attachment server 119 but it is understood that communications are through network 114 via gateway 116 and proxy server 118.

Due in part at least to communication protocol constraints on a message's size, a single message may be insufficient to communicate all of the text information and/or all of the slide images for a slide presentation document. Thus, the portable electronic device 112 can make multiple requests either automatically or in response to direct or indirect user actions. For example, as described above, during a slide show, the slide presentation viewer 325 can automatically make requests for slide information in the background while a slide show is being viewed. For example, the viewer 325 can anticipate the need for more slide information in response to input via trackball or touch input 250 scrolling toward the end of the slides present on the handheld device. In some implementations, a menu choice may be invoked (e.g. a "More" command) for additional slide information, as applicable, to preload slides.

In some implementations, a request (e.g. for slide information) includes a flag or other data indicating a screen size for the portable electronic device 112 when rendering slide images. This can be a specific pixel size (e.g. 340×280), a code flag (1=340×280 pixels) or a device type, among other types, where the attachment server 119 or proxy server 118 determines the screen size from the code flag or device type. Other display capabilities can be indicated to the attachment server 119 as well or alternatively. For example, the color capabilities of the display screen (e.g. back and white only or the number of colors available), reflective type, etc. can be indicated to help render slide images. The attachment server 119 then can adjust the color palette of the rendered slide presentation for viewing on the requesting device.

Slide presentation viewer 325 can provide a graphical user interface (GUI) to present the slides in the various modes and provides a menu or other command interface for user input to invoke the presentation application 319 for transmitting the slide presentation to presentation device 113 and controlling the presentation thereat.

More particularly, presentation device 113 can include a presentation adapter 360 for communicating with presentation application 319.

In addition to presentation adapter 360, presentation device 113 includes other hardware and software such as communications 365, other projector applications 370 (e.g., for communicating with display 190) and operating system 375.

Figure 3:
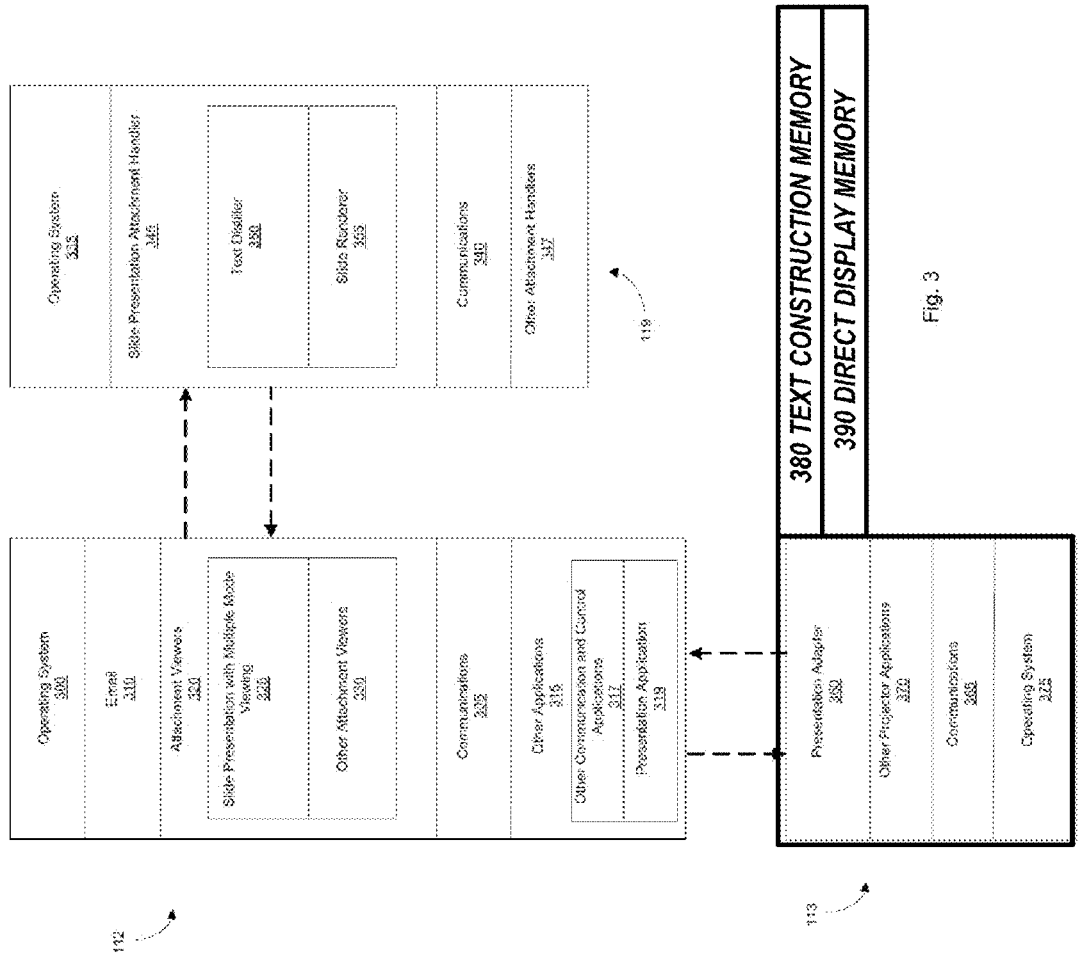
FIG. 3 is a block diagram showing functional components of the technology.
Figure 4:
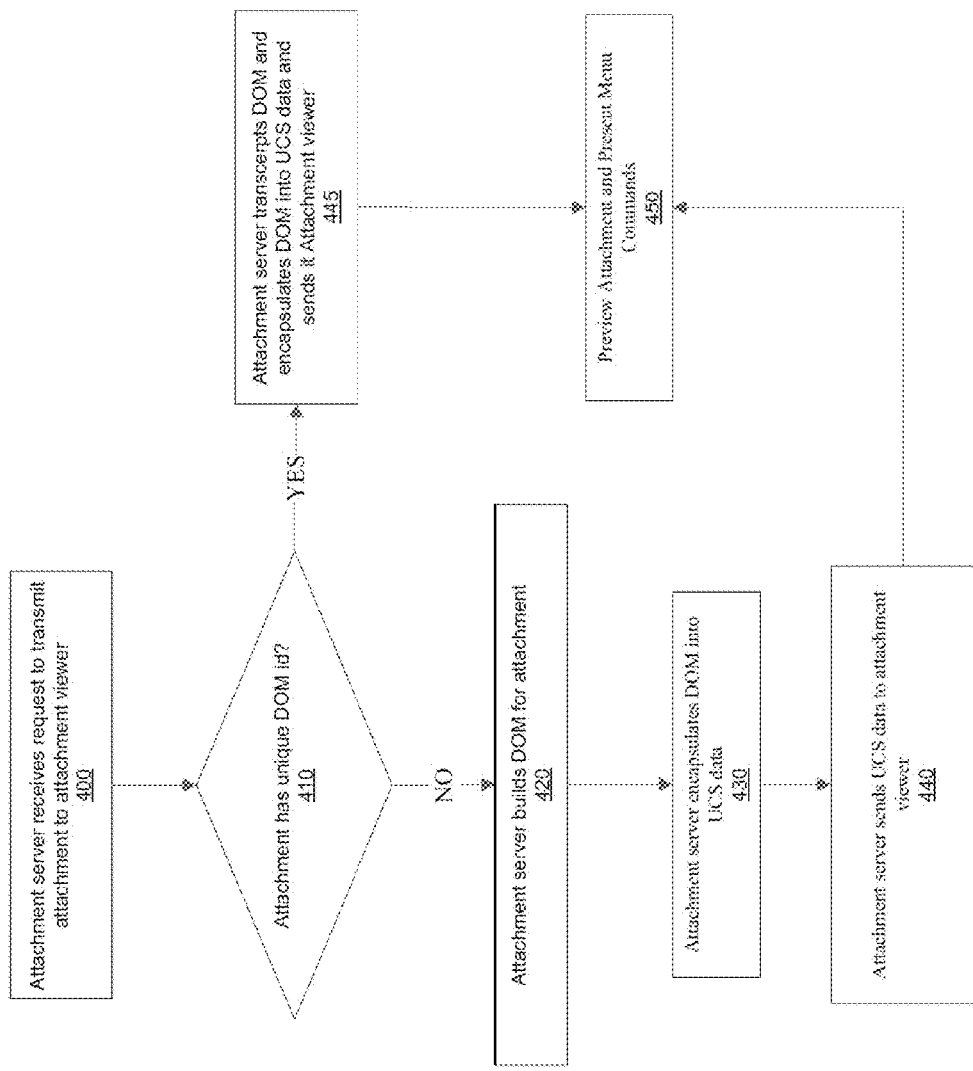
FIG. 4 is a flowchart illustrating methods of the technology, using the functional components of FIG. 3.

With reference to FIG. 4, example methods are set forth for downloading and viewing a presentation on the portable electronic device 112, e.g., using the functional components of FIG. 3. First, at 400, the portable electronic device 112 can request an attachment (e.g. slide presentation) from attachment server 119. The request can be initiated, for example, by a trackball click or menu item selection to "Open attachment"

or "Download attachment." The presentation attachment may be an attachment to an email, calendar event, instant message (IM), browser link, or other attachment-enabled object.

Figure 5:
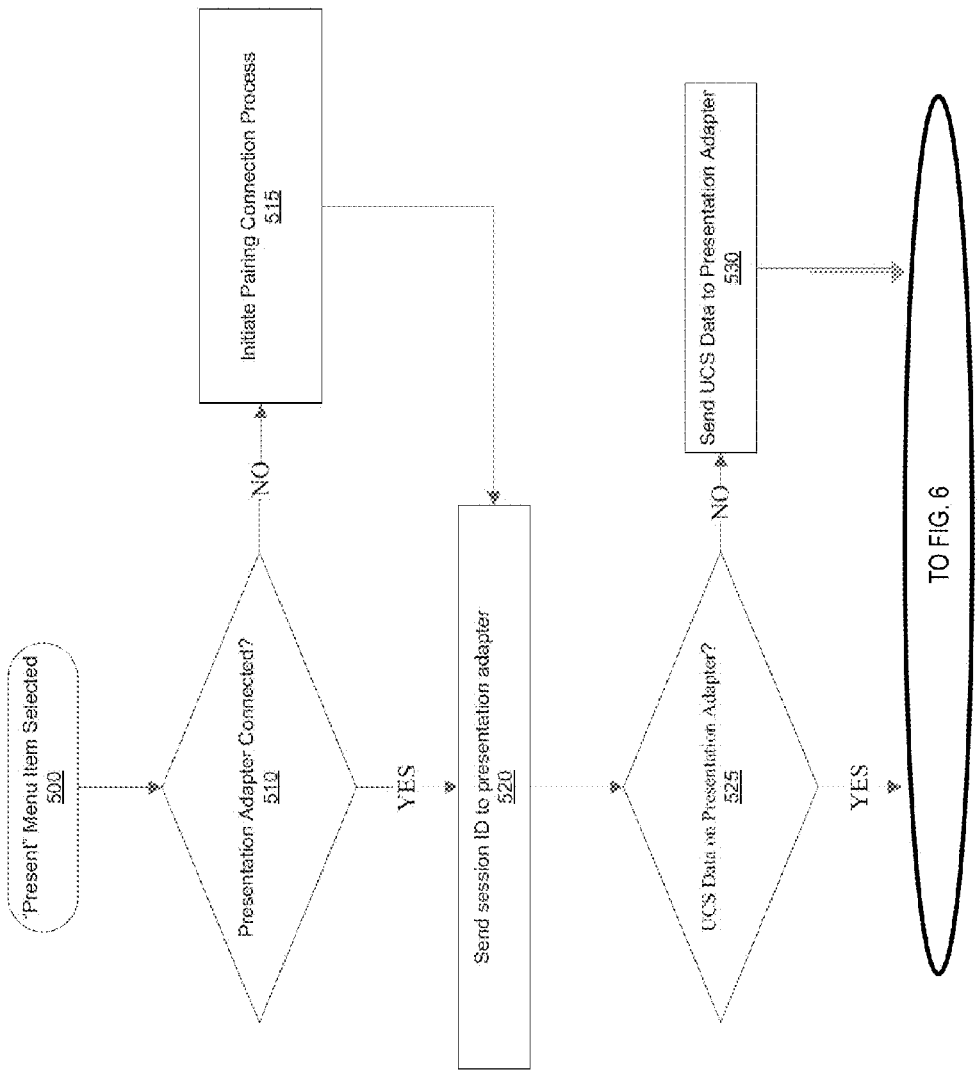
FIG. 5 is a flowchart illustrating methods of the technology, using the functional components of FIGS. 1-3.

If the presentation attachment has been saved to memory of the device 119, e.g. a persistent store 230 or Secure Digital (SD) card (not shown), then the attachment can be retrieved locally to the device 119, and process flows continues at FIG. 5.

If the presentation attachment has not been previously requested (e.g., a "No" at 410), attachment server 119 can build a DOM that represents the attachment, e.g., by parsing the attachment document (step 420). In this manner, a graph structure can be built within attachment server 119 representing a model of the original attachment file. The DOM contains textual content, font, style and formatting attributes as well as layout attributes, such as page/slide size, positioning information (i.e. x, y and z coordinates on the page), embedded graphics and tables, for example. DOM structure is known and is disclosed in U.S. Patent Application No. 2006/0055693. Approaches other than use of DOMs to represent a presentation are within the scope of the present technology. The DOM representation is used as an example.

Once the DOM of the attachment has been built the attachment server 119 can transcerpt and encapsulate the DOM in UCS data, as indicated at 430. The UCS data then can be sent to portable electronic device 112 in chunks, as indicated at 440. Each chunk is a self-contained data representation of a portion of the presentation attachment (e.g. one image of a slide, one slide of a presentation). That is, there is sufficient data contained in a chunk to enable the attachment viewer to display the content of the chunk. Depending on the size of the chunks and the size of the attachment, the entire attachment can be transmitted in one chunk or in multiple chunks. Depending on the nature of the request from the attachment viewer, attachment server 119 can transmit the chunks in sequence or out of sequence. For example, if the attachment viewer requests the fifth slide of a presentation attachment, attachment server 119 can transmit the chunks corresponding to the fifth slide, even if chunks for slides 1 to 4 have not been transmitted to the device 112.

The attachment then can be previewed via display 260, and several menu or command options are made available (450) such as "Present", "Retrieve Info/View Info", "Zoom", "Rotate", "Fit to Screen", "Next Slide", "Prey Slide (if applicable), "Save Slide", "Download Attachment", "Help", "Call Voice Mail", etc. Additional operations can be performed in response to actuation of the trackball/touch input device 250, such as scrolling to a next (or previous) slide.

If the attachment has been previously requested (e.g., a "Yes" at 410), attachment server 119 can transcerpt and encapsulates the DOM in UCS data, and transmit the UCS data to portable electronic device 112 in chunks, as indicated at 445, for display (450).

In some implementations, device 112 can perform one or more of DOM build and UCS formatting, e.g., on presentation files stored on the device.

Upon selection of the "Present" command (500), the presentation application 319 is launched, as shown in FIG. 5. At 510, the application can check to see that the presentation adapter 360 is connected. If not, a communication channel is established between portable electronic device 112 and presentation device 113, e.g. via a pairing connection process (515) such as Bluetooth® wireless technology pairing. A typical pairing connection process calls up a wizard for presenting steps to establish communication pairing between the device 112 and presentation adapter 360 of the presentation device 113 using the communications applications 305 and 365 (e.g. Bluetooth discovery and pairing). Other wireless and wired communications technologies can be used between the device 112 and the presentation device 113.

At 520, the application 319 sends a session ID to the paired presentation adapter 360. The application then checks for slide presentation data (e.g. a first UCS chunk representing the first slide) having already been transmitted to and locally stored at the presentation adapter 360 (525). This can be accomplished, for example, by comparing check sums, or any other appropriate method. If not, the presentation application 319 sends the slide data to the presentation adapter 530 (and, in some implementations, requesting additional data from the attachment server 119, as discussed above in connection with FIG. 4).

Figure 6:
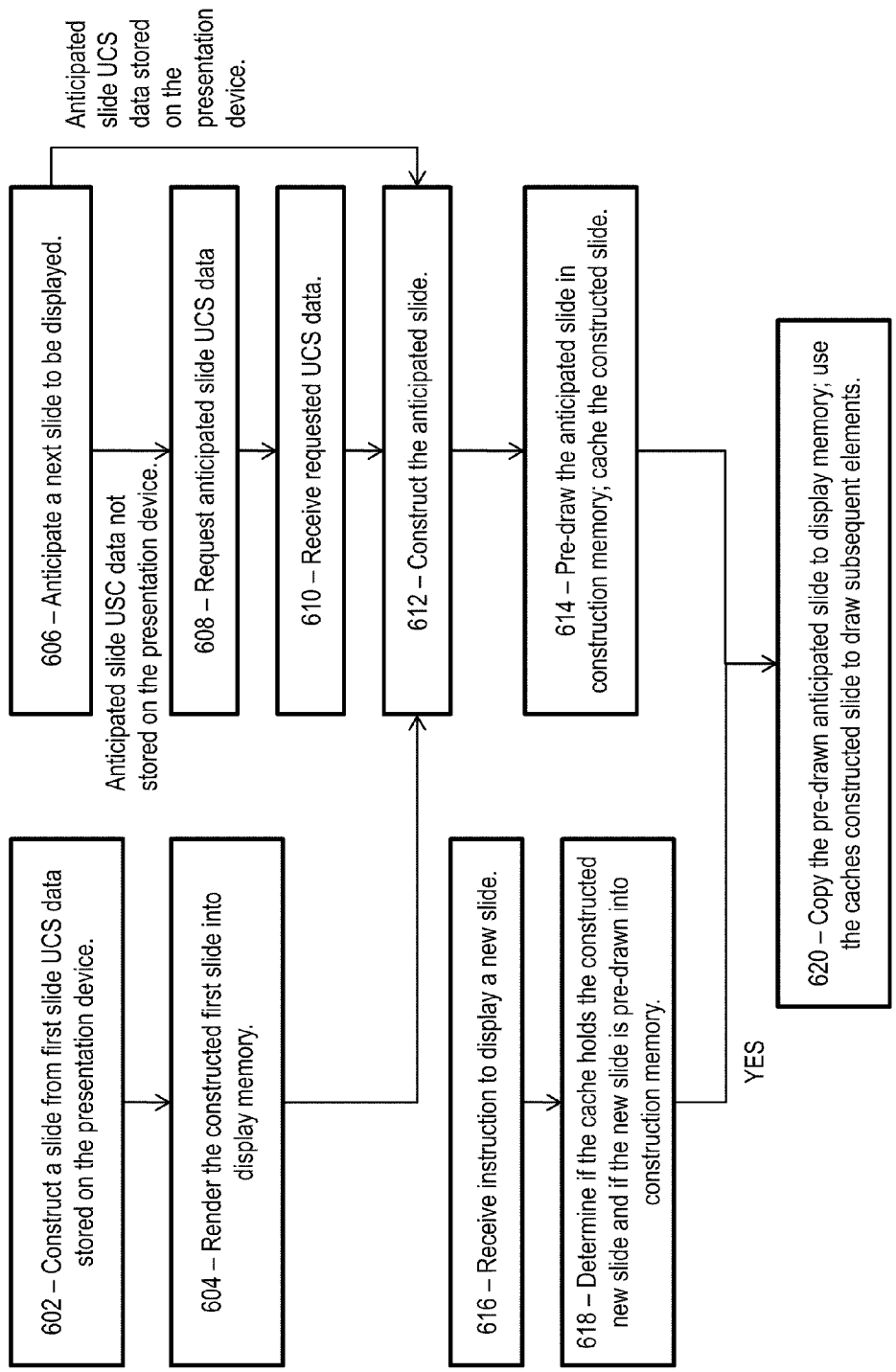
FIG. 6 is a flowchart illustrating methods of caching a ready-to-display representation of an anticipated slide in slide construction memory of a presentation device.

Referring to FIG. 6, methods 600 of the technology are illustrated. UCS data representing a slide of a presentation is now stored in memory of presentation device 113, whether from the portable electronic device 112, SD memory card of the presentation device 113, or otherwise. The presentation device 113 constructs the slide from the stored UCS data 602 (typically a collection of objects, e.g., text, static graphics, animated graphics) to a format compatible with the targeted display technology 190. Such processes can include, e.g., image decompression, text rendering, color conversion, setup of animation information for the slide. In some implementations of the presentation device 113, the device 113 includes UCS data processing memory allocated to text construction. The text construction memory is sized to accommodate a full slide of text, e.g., filling a 1024×768 display. Processing of the UCS data in this fashion results in a constructed slide.

The constructed slide is rendered 604 to a region of presentation device 113 memory allocated to direct display 390, e.g., a visible region in a ready-to-display format, typically in response to an instruction from an electronic device 112. Rendering the ready-to-display data in a visible region frees up memory space used during slide construction, e.g., the text construction region. In typical presentation devices, the slide construction region 380 remains unused until the presentation device 113 receives UCS data for another slide, e.g., as a consequence of the mobile device 112 receiving a command to transition to a slide of the presentation that has not been stored as UCS data on the presentation device 113.

Implementations of the present technology anticipate the next slide to be presented 606. If the UCS data for the anticipated slide is not stored on the presentation device, some implementations can request the UCS data for the anticipated slide 608.

After receiving the anticipated slide UCS data 610, whether by request or otherwise (and preferably after copying any earlier-constructed slide to a visible region of presentation device 113 memory), implementations of the technology construct the anticipated slide 612. The constructed anticipated slide is cached 614a and pre-drawn 614b into the memory space allocated to slide construction 614. In this fashion, the anticipated slide is ready for copying to a visible region (e.g., main buffer, flip buffer under control of a video driver) of presentation device 113 memory.

In some implementations, the anticipated slide is the next slide in sequence in the presentation. In some implementations, the anticipated slide can be determined from slide metadata, e.g., the title slide, the heading slide of a next presentation section, the slide that has been displayed the most times during the presentation, the slide that has been displayed for the longest period of time during the presentation, etc. In some implementations, the memory space otherwise allocated to slide construction that is used to pre-draw the anticipated slide can be the text construction memory.

When the presentation device 113 is instructed to proceed to a slide different than the one currently being made available for display 616, the presentation device can determine if the cache holds the constructed new slide and if the new slide is pre-drawn in construction memory 618, i.e., if the anticipated slide is the slide for which it received a new display instruction. If so, then the presentation device 113 can copy the pre-drawn anticipated slide into the visible portion of memory (display memory), and use the cached constructed anticipated slide for rendering the new slide as necessary 620. In this fashion, the presentation device 113 can reduce the latency between slides when the anticipated slide is the new slide that the presentation device is instructed to display.

In some implementations, slide construction is a higher-priority use than slide caching for the memory used for slide caching. In those implementations, when the presentation device 113 has a slide construction task, that task takes priority over slide caching.

Figure 7:
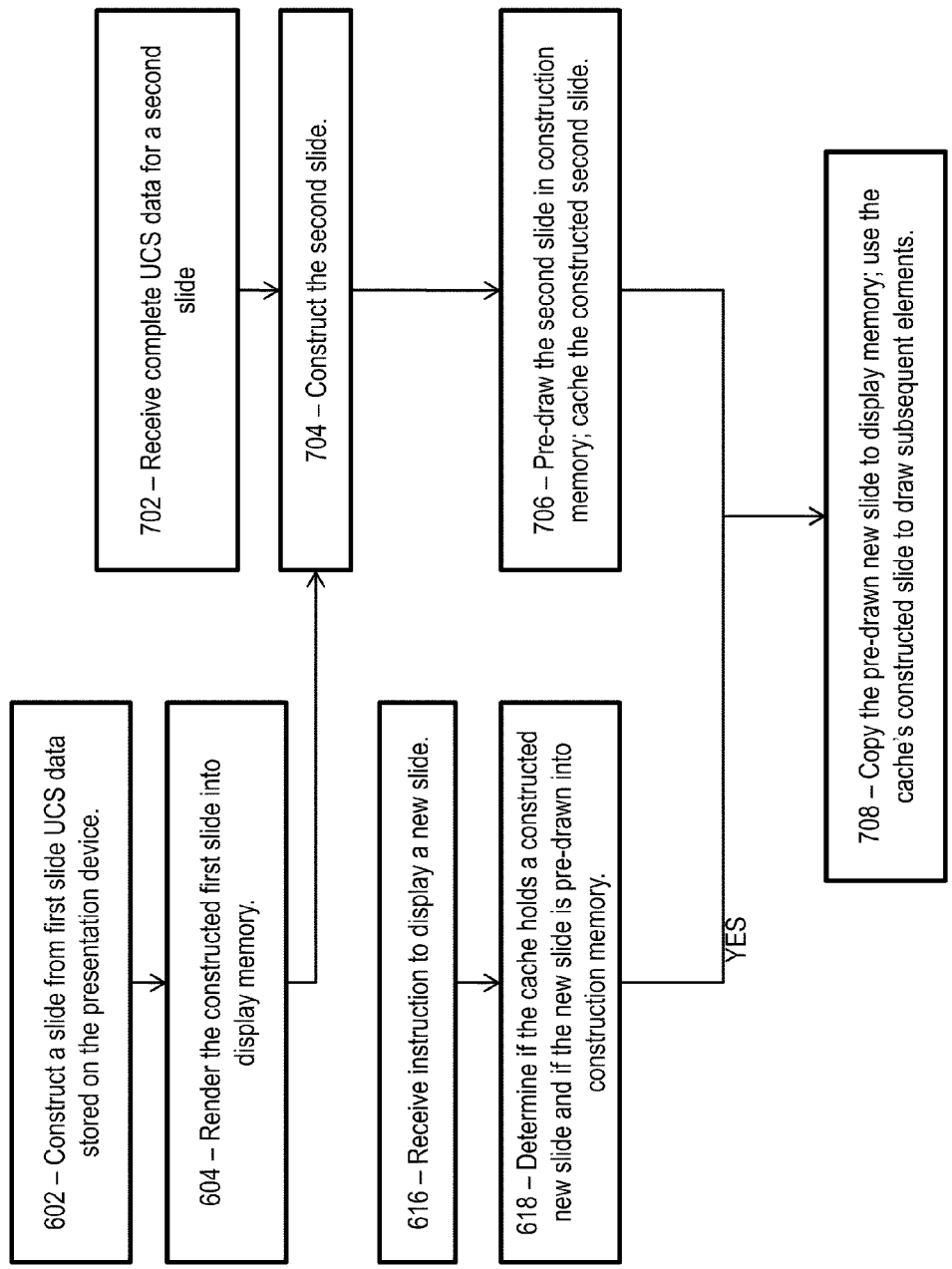
FIG. 7 is a flowchart illustrating methods of caching a ready-to-display representation of an anticipated slide in slide construction memory of a presentation device.

Referring to FIG. 7, methods 700 of some implementations of the technology are illustrated. As with methods 600, UCS data representing a slide of a presentation is now stored in memory of presentation device 113, whether from the portable electronic device 112, SD memory card of the presentation device 113, or otherwise. The presentation device 113 constructs the slide from the stored UCS data 602. The constructed slide is rendered 604 to a region of presentation device 113 memory allocated to direct display. While the presentation device is constructing and displaying the first slide, it is loading a second slide in presentation device memory. These implementations seek to construct, and pre-draw in construction memory, the very next slide stored—rather than otherwise anticipate the next slide to be displayed. When the presentation application receives the complete USC data for the second slide 702, the presentation device 113 constructs the second slide 704. The presentation device 113 then pre-draws the constructed second slide in memory 706a and caches the constructed second slide 706b. As with methods 600, when the presentation device 113 is instructed to proceed to a new slide different than the one currently being made available for display 616, the presentation device can determine if the cache holds the constructed new slide and if the new slide is pre-drawn in construction memory 618, i.e., if the second slide is the slide for which it received a new display instruction. If so, then the presentation device 113 can copy the pre-drawn anticipated slide into the visible portion of memory (display memory), and use the cached constructed anticipated slide for rendering the new slide as necessary 708. In this fashion, the presentation device 113 can reduce the latency between slides when the anticipated slide is the new slide that the presentation device is instructed to display.

The present technology can take the forms of hardware, software or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

Figure 8:
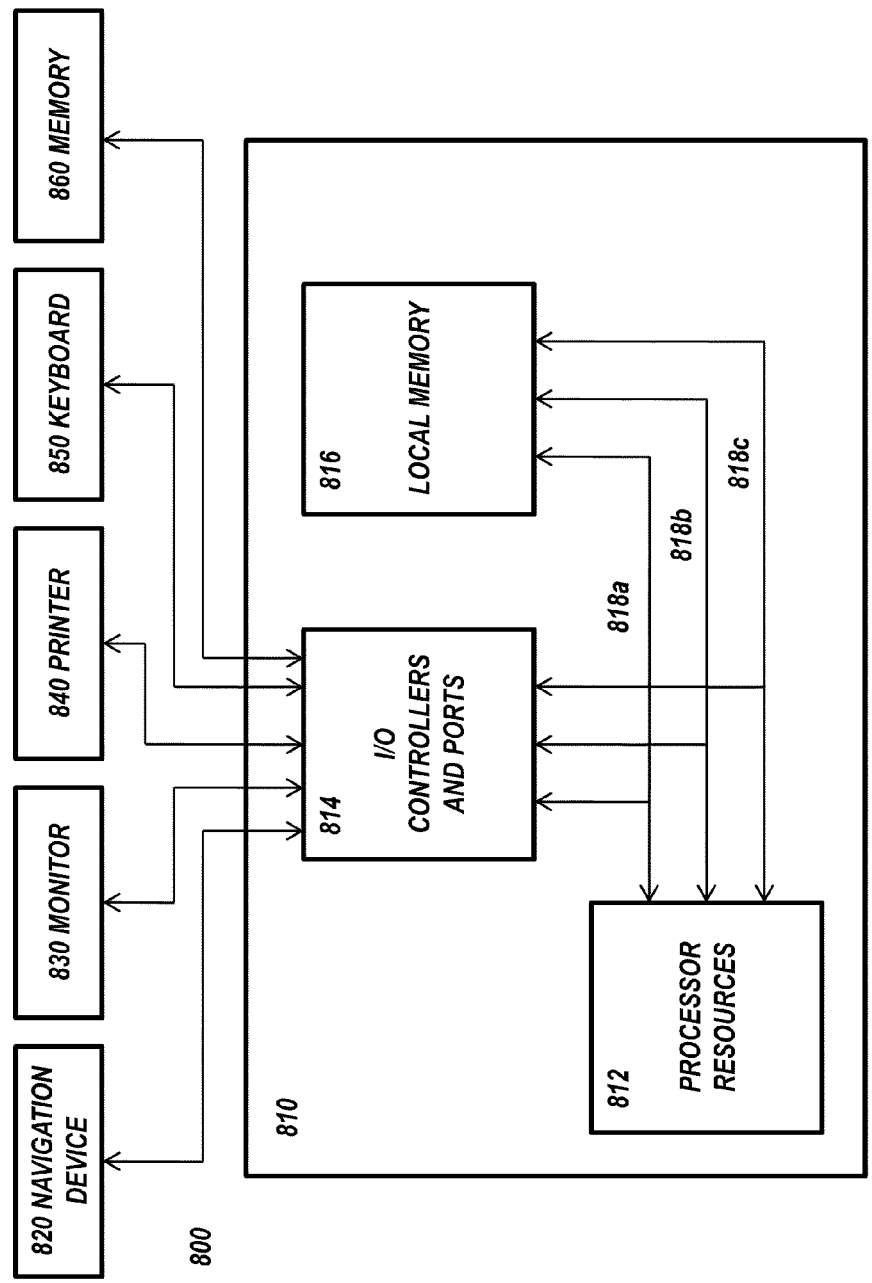
FIG. 8 illustrates a data processing system suitable for storing a computer program product of the present technology and for executing the program code of the computer program product.

Referring to FIG. 8, a data processing system (e.g., 800) suitable for storing a computer program product of the present technology and for executing the program code of the computer program product can include at least one processor (e.g., processor resources 812) coupled directly or indirectly to memory elements through a system bus (e.g., 818 comprising data bus 818a, address bus 818b, and control bus 818c). The memory elements can include local memory (e.g., 816) employed during actual execution of the program code, bulk storage (e.g., 860), and cache memories (e.g., including cache memory as part of local memory or integrated into processor resources) that provide temporary storage of at least some program code in order to reduce the number of times code must be retrieved from bulk storage during execution. Input/output or I/O devices (including but not limited to keyboards 850, displays 830, pointing devices 820, etc.) can be coupled to the system either directly or through intervening I/O controllers (e.g., 814). Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A computer-implemented method for slide presentation, the method comprising:
 displaying a first slide at a presentation device;
 receiving, from an attachment server, complete Universal Content Stream text and graphics data of a second, non-consecutive, slide in an unconstructed format, the second slide having been determined, without user input, from metadata of the second slide;
 constructing, at the presentation device, the second slide from the received data via image decompression, text rendering and color conversion processing;
 caching the constructed slide in a cache of the presentation device;
 pre-drawing the constructed slide in text construction memory of the presentation device;
 receiving instructions to display a slide which is not currently in a display memory of the presentation device; and
 only in the event that the instructed slide is the cached and pre-drawn slide, rendering the pre-drawn slide to the display memory of the presentation device.

2. The computer-implemented method of claim 1 wherein: the second slide is the slide most frequently-presented during a current presentation.
3. The computer-implemented method of claim 1 wherein: the second slide is the title slide of a current presentation.
4. The computer-implemented method of claim 1 wherein: the second slide is the slide longest displayed during a current presentation.
5. The computer-implemented method of claim 1 wherein: caching the constructed slide is a lower priority activity than constructing another slide.
6. A computer program product for slide presentation, the computer program product comprising:
 at least one non-transitory computer readable medium; and
 at least one program module,
  stored on the at least one medium, and
  operative, upon execution by at least one processor for:
   displaying a first slide on a display device;
   receiving from an attachment server, complete Universal Content Stream text and graphics data of a second, non-consecutive, slide in an unconstructed format, the second slide having been determined, without user input, from metadata of the second slide;
   constructing, at the display device, the second slide from the received data via image decompression, text rendering and color conversion processing;
   caching the constructed slide in a cache of the display device;
   pre-drawing the constructed slide in text construction memory of the display device;
   receiving instructions to display a slide which is not currently in a display memory of the display device; and
   only in the event that the instructed slide is the cached and pre-drawn slide, rendering the pre-drawn slide to the display memory of the display device.

7. The computer program product of claim 6, wherein: the second slide is the slide most frequently-presented during a current presentation.
8. The computer program product of claim 6 wherein: the second slide is the title slide of a current presentation.
9. The computer program product of claim 6 wherein: the second slide is the slide longest displayed during a current presentation.
10. The computer program product of claim 6 wherein: caching the constructed slide is a lower priority activity than constructing another slide.
11. A system for slide presentation on a portable electronic device, the system comprising:
 at least one processor within the portable electronic device,
 at least one computer readable medium in communication with the processor;
 at least one program module,
  stored on the at least one medium, and operative upon execution by the processor for:
   displaying a first slide;
   receiving, from an attachment server, complete Universal Content Stream text and graphics data of a second slide in an unconstructed format, the second slide being non-consecutive to the first slide, the second slide having been determined, without user input, from metadata of the second slide;
   constructing, at the portable electronic device, the second slide from the received data via image decompression, text rendering and color conversion processing;

caching the constructed slide in a cache of the portable electronic device;

pre-drawing the constructed slide in construction memory of the portable electronic device;

receiving instructions to display a slide which is not currently stored in a display memory of the portable electronic device; and only in the event that the instructed slide is the cached and pre-drawn slide, rendering the pre-drawn slide to the display memory of the portable electronic device.

12. The system of claim 11, wherein:
the second slide is a slide most frequently-presented during a current presentation.

13. The system of claim 11 wherein:
the second slide is a title slide of a current presentation.

14. The system of claim 11 wherein:
the second slide is a slide longest displayed during a current presentation.

15. The system of claim 11 wherein:
caching the constructed slide is a lower priority activity than constructing another slide.

\* \* \* \* \*